(12) United States Patent
Eden et al.

(10) Patent No.: US 6,379,447 B1
(45) Date of Patent: *Apr. 30, 2002

(54) POLYSACCHARIDE ADHESIVES FOR MULTI-PLY PAPER PRODUCTS

(75) Inventors: James L. Eden, E. Millstone; Eric M. Weisser, Somerset; Daniel B. Solarek, Belle Mead, all of NJ (US)

(73) Assignee: National Starch and Chemical Investment Holding Corporation, New Castle, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,084

(22) Filed: Apr. 5, 1999

(51) Int. Cl.$^7$ ............................................. C09J 103/02
(52) U.S. Cl. ............................ 106/205.01; 106/205.2; 106/205.72; 106/206.1; 106/210.1; 106/215.5
(58) Field of Search ................. 106/205.01, 206.1, 106/205.2, 205.72, 210.1, 215.5

(56) References Cited

U.S. PATENT DOCUMENTS 3,630,775 A * 12/1971 Winkler ...................... 127/32
3,673,060 A    6/1972 Murphy et al. .............. 161/126
4,374,217 A * 2/1983 Miyake et al. ................. 524/47
5,188,674 A * 2/1993 Kasica et al. .................. 127/65

FOREIGN PATENT DOCUMENTS

WO    WO 96/24485    8/1996    ............. B32B/7/10

* cited by examiner

Primary Examiner—David Brunsman
(74) Attorney, Agent, or Firm—Laurelee Duncan, Esq.; Eugene Zagarella, Esq.

(57) ABSTRACT

An aqueous, light weight paper laminating adhesive comprising a continuous aqueous phase of from about 15 to 50% by weight of polysaccharide material dispersed in water, the continuous phase polysaccharide material having a zero-shear viscosity of greater than 0.07 Pa·s when measured at 26% (+/−1% solids) and a shear rate of $0.1s^{-1}$; a shear-thinning index of 0.90 to 1.1; and bleed time of greater than 15 seconds. Also disclosed is another adhesive composition, which is particularly useful in non-contact spay applications and comprises the continuous phase polysaccharide phase described above as well as a second component comprising a water swellable, insoluble polysaccharide particulate phase.

10 Claims, No Drawings

POLYSACCHARIDE ADHESIVES FOR MULTI-PLY PAPER PRODUCTS

BACKGROUND OF THE INVENTION

This invention relates to selected polysaccharide laminating or bonding adhesives having high bond strength and low bleed properties and which are useful in multi-ply, light weight paper products.

The use of paper, particularly light weight paper in articles such as tissue or towels is well known. In order to add and improve properties such as absorbency, bulk, smoothness, drape and hand (feel), these products are often fabricated in multi layers, i.e., multi-ply articles. In the end use of these multi-ply articles and in converting steps such as slitting, rewinding, folding and printing, it is desirable that the plies remain in register and not slip in relation to each other. This is accomplished by bonding the plies and is conventionally done by mechanical means such as embossing or through the use of an adhesive.

Mechanical means of bonding multi-ply articles by embossing through all plies in bands near the article's edge or in partial coverage patterns distributed across the surface is often used. However, such means generally provide low bond strength.

Adhesives have also been used to provide bonds for multi-ply articles. They are generally applied at low solids (typically less than 10% by weight) and depending on the articles being made, either by non-contact methods such as spraying or by contact methods using transfer rolls. While various adhesive materials such as cellulose, polyvinyl alcohol and starch have been used in these applications, depending on the particular composition they often have one or more problems such as bleed, low strength or application difficulties (e.g., slow fabrication speeds and slow bond development) due to low solids content.

Illustrative preparation of multi-ply paper products is disclosed in WO 96/24485 published on Aug. 15, 1996 to T. Rydell et al. This patent publication discloses the use of various adhesives such as silicates, glue, starch adhesives, cellulose and polyvinyl alcohol and utilizes the high bleed, strike through characteristics of these materials in preparing mutli-ply paper laminates.

Another disclosure of preparing multi-ply paper products is found in U.S. Pat. No. 3,673,060 issued Jun. 27, 1972 to J. Murphy et al. This patent discloses the combination of embossing means plus the use of an adhesive such as polyvinyl alcohol to prepare laminated napkins.

Despite the well known use of different adhesives in preparing multi-ply paper products as illustrated above, there is still the need for new adhesive materials which can provide high strength, low bleed characteristics and are readily applicable in different application techniques.

SUMMARY OF THE INVENTION

It has now been found that selected high solids, polysaccharide based aqueous adhesives that provide high bond strength and low bleed properties and also are repulpable, have other properties that makes them particularly useful in the preparation of multi-ply light weight paper products.

More particularly, this invention involves an aqueous, high-solids, polysaccharide based adhesive composition comprising a continuous aqueous phase of from about 15 to 50% by weight of starch/dextrin material or blend thereof dispersed in water, the continuous phase starch/dextrin or blend having:

a) a zero-shear viscosity of greater than 0.07 Pa·s when measured at 26% (+/−1%) solids, 120° F. (49° C.) and a shear rate of $0.1s^{-1}$, b) a shear thinning index of 0.9 to 1.1 and c) a bleed time of greater than 15 seconds.

This invention further involves an adhesive composition comprising the continuous phase starch/dextrin dispersed aqueous component described above, as well as a second component comprising a water swellable, insoluble polysaccharide particulate phase, the adhesive composition having a bleed time of greater than 70 seconds when measured at 19% (+/−1%) solids at 120° F. (49° C.).

This invention further involves a continuous phase polysaccharide adhesive composition, particularly for contact applications, comprising a starch/dextrin material wherein the continuous phase has a zero-shear viscosity of greater than 0.05 Pa·s measured at 26% (+/−1%) solids, 120° F. (49° C.) and a shear rate of $0.1s^{-1}$ and a bleed time of greater than 7 seconds.

DETAILED DESCRIPTION OF THE INVENTION

This invention is directed to adhesives used in the fabrication of multi-ply light weight paper products. Such products include tissue and towels such as facial tissue, toilet or sanitary tissue, napkins, paper towels as well as embossed towels. The term "paper" as used herein refers to products made from cellulosic fibers in a wet end or wet laid process. This includes pulp or paper derived from wood pulp, sulfate or sulfite pulp. The light weight paper products as described herein are typically made using paper of less than about 30 $lb/3300\ ft^2$.

The methods of applying adhesive for use in the manufacture of multi-ply paper products are well known. Typically, they involve a non-contact method where the adhesive is applied by spraying or atomization or a contact method where the adhesive is transferred from a roll in contact with the inner surface of a web. The spray, non-contact method is particularly useful in the preparation of tissue products while the contact transfer method is predominantly used in the preparation of paper towels where embossing is often employed. The adhesive that is used in preparing multi-ply paper products will depend on the particular application and the conditions used. The polysaccharide based adhesive composition of this invention can be used or varied and adapted so that it can be used in either non-contact or contact applications as further described herein.

The base polysaccharide material used in the continuous phase of the adhesive of this invention is characterized by specific rheological properties. The polysaccharide may comprise a starch or dextrin or a blend of starch and dextrin. The polysaccharide may comprise a starch derived from any plant source including corn, potato, wheat, rice, tapioca, waxy maize, waxy rice, sago, sorgum, high amylose starch such as high amylose corn, etc. Also include are the conversion product derived from any of the former bases including, for example, dextrins prepared by the hydrolytic action of acid and/or heat such as maltodextrin and pyrodextrin; oxidized starches prepared by treatment with oxidants such as sodium hypochlorite; fluidity or thin-boiling starches prepared by enzyme conversion or mild acid hydrolyses; derivatized starches such as starch ethers and esters and physically modified starches. The polysaccharide component may also include water soluble gums to help the composition satisfy desired properties such as solids content, Theological and bleed properties.

The aqueous dispersed continuous phase must satisfy certain rheological properties including a zero-shear viscosity and shear-thinning index as well as providing selected bleed requirements. Typical polymeric solutions, such as the aqueous dispersed-continuous phase types described herein, can show a viscosity that is dependent on rate, i.e., the resistance to deformation (viscosity) is a function of the deformation rate (shear rate). It is well known in the rheology literature that the viscosity of these materials approach a constant value at low shear rates called "zero-shear viscosity". The test procedure for determining the zero-shear viscosity is described below. The starch-dextrin dispersed phase as used in this invention will have a zero-shear viscosity of greater than 0.07Pa·s when measured at 26% (+/−1%) solids, 120° F. (49° C.) and a shear rate of $0.1s^{-1}$. Preferably the zero-shear viscosity will be greater than 0.1 Pa·s.

The other rheological property for the aqueous dispersed, continuous phase component is known as the "shear-thinning index" (n'). The shear-thinning index is a measure of the reduction in viscosity across a defined deformation rate change. The test procedure for determining the shear-thinning index is also described below. The aqueous dispersed continuous phase as used in this invention will have a shear-thinning index of between 0.90 and 1.1, preferably between 0.95 and 1.1.

The aqueous dispersed, continuous phase of this invention must also satisfy certain bleed requirements in addition to the reheological properties. Bleed is defined as a measure of the tendency of the adhesive to penetrate into the substrate. Materials having a low bleed tendency, or high bleed time are expected to provide suitable laminating adhesive performance. Materials with a high bleed tendency, or low bleed time, are known not to perform and are characterized by "strike through" or transfer of the adhesive through the bonded substrate layers. A detailed description of the bleed test used is described below. The adhesive composition of this invention containing the aqueous dispersed continuous phase will have a bleed time of greater than 15 seconds and preferably greater than 50 seconds.

The aqueous dispersed continuous polysaccharide component as described herein can be prepared for use as an adhesive by cooking and dispersing the polysaccharide in water at a solids of about 15 to 50%. The polysaccharide may be cooked using any of the known techniques including atmospheric cooking, jet cooking, steam injection cooking, high shear cooking, retorting or autoclaving. Typical cooking conditions can range from a temperature of at least the gelatinization temperature of the material and this can be from about 70 to 200° C. or higher depending on the conditions and type of cooking being utilized. Additionally, the polysaccharide component can be physically processed to render it pregelatinized by any of several methods known in the art, such as drum drying and extrusion etc., prior to the addition of water.

As described above, the particular adhesive used in preparing multi-ply products will depend to some extent on the type of application. While the composition having a dispersed or continuous phase, as described above, is useful in non-contact application, it has been found that in spray-type applications, a variation in the composition will provide improved properties. This variation involves the addition of a second component comprising a water swellable, insoluble polysaccharide particulate phase. This second component helps to improve sprayability by providing better atomization and control of atomization and also helps to reduce bleed. The particulate polysaccharide second component of the adhesive composition may comprise any polysaccharide that provides swellable, discrete particles that are not soluble. This, for example, could be a starch which is not fully cooked out and contains swollen granules or discrete particles.

More particularly, the water swellable, insoluble polysaccharide particulate that comprises the second component of the adhesive composition will be a crosslinked starch, thermally inhibited starch or crosslinked (chemically or natural) gum that when cooked swells up and retains a particulate structure and doesn't disintegrate during processing and use.

The crosslinked starch used in this invention are those known in art and may include starch which is treated with a number of multi-functional crosslinking agents such as disclosed in "Starch Derivatives: Production and uses" by M. Rutenberg and D. Solarek, *Starch: Chemistry and Technology*, Chapter X, pp. 324–332, 1984. Such crosslinking agents include bifunctional etherifying and/or esterfying agents such as epichlorohydrin, bis-chloroethyl ether, dibasic organic acids, phosphorus oxychloride, trimetaphosphate (i.e., the alkali and alkaline earth metal salts), linear mixed anhydrides of acetic and di- or tribasic carboxylic acids. Another useful crosslinking agent is sodium hypochlorite, which when used in the proper amount and under proper pH conditions (11 or more) provides crosslinked starches. Particularly useful crosslinking agents are epichlorohydrin, phosphorus oxychloride, adipic-acetic anhydrides and sodium trimetaphosphate. The amount of crosslinking is not critical and will generally be a small amount that is sufficient to allow the cooked material to swell up and not disintegrate. The crosslinked starch may also be further modified with other reagents to provide cationic, anionic or amphoteric groups. One particularly useful group is cationic modification with tertiary amino or quaternary ammonium ether groups.

Thermally inhibited starches where the starch is heat treated in a selected manner may be used instead of or in addition to the crosslinked starches. Thermally inhibited starches are known and have been described in U.S. Pat. 5,725,676 issued Mar. 10, 1998 to C. Chiu et al., which patent is incorporated herein by reference.

The amount of water swellable, insoluble polysaccharide particulate material used as the second component of the adhesive composition will vary from about 1.5 to 12.5% by weight based on the total weight of aqueous composition. In this formulation, the continuous or dispersed polysaccharide phase will comprise from about 13.5 to 48.5% by weight based on the total weight of the aqueous composition.

The polysaccharide particulate component needs to be suspended in water. Except for cold water dispersable material, this will involve the same known cooking techniques such as atmospheric or jet cooking as described above. This cooking may take place separately for each component or more preferably will involve one single cooking operation where all components and ingredients are combined.

When using a contact application procedure such as one involving transfer rolls, the adhesive that is preferably used will be one involving the continuous aqueous polysaccharide (starch/dextrin) phase. This continuous phase will have varied properties from the one described previously and will have a zero-shear viscosity of greater than 0.05 Pa·s, preferably greater than 0.2 Pa·s and preferably less than 20 Pa·s measured at 26% (+/−1%) solids, 120° F. (49° C.) and a shear rate of $0.1s^{-1}$. Also, this adhesive with continuous polysaccharide phase for use in contact applications will have a bleed time of greater than 7 seconds and preferably greater than 10 seconds.

In addition to the continuous phase component and the particulate component when used, minor amounts of conventional additive components may optionally be added to the adhesive formulations of this invention. Such additives and ingredients include defoamers, preservatives or biocides, tackifiers, detackifiers, wetting agents, release agents, dyes, etc. Typically, these additives will comprise from 0 to 5% by weight based on the total weight of the composition.

The following test procedures were used to determine the rheological and bleed properties for the adhesives of this invention.

Rheology Test

The rheology tests for measuring zero-shear viscosity and the shear-thinning index are carried out on a Rheometrics Fluids Spectrometer II (Rheometrics Scientific, Piscataway, N.J.). Measurements were made using the couette geometry in all cases. The testing procedure utilized is based on standard techniques in the art and is described in detail by C. W. Macosko (Rheology Principles, Measurement and Applications, Chapters 1, 2 and 5, VCH, NY, 1994).

To measure the zero-shear viscosity, a sample of the selected aqueous dispersed phase component (starch dextrin or blend) was fully dispersed at 26% (+/−1%) solids by weight and placed in the couette rheometer cell. The instrument was set in steady-state mode at 120° F. (49° C.) and rate sweep was performed from 0.1 to $100s^{-1}$ with 5 points per decade of shear-rate. Each value of shear-rate was applied for 60 seconds, with no torque reading taken during the initial 30 seconds. By the end of this period, any time effects that were likely to occur had been reduced to levels that would not influence the viscosity measurement. Torque readings obtained during the final 30 seconds at each shear rate were converted to viscosity values, based on the geometry of the fixture used and the torsion constant of the instrument.

The resultant viscosity-shear rate data was analyzed for the zero-shear viscosity, taken as the viscosity at a shear-rate of $0.1s^{-1}$.

The shear-thinning index was determined by first calculating the slope of the viscosity versus shear-rate plot between shear rates of 0.1 and $100s^{-1}$ and then using the formula:

$$n'=1+\text{slope}$$

where n' is the shear-thinning index, and the slope is determined as described above.

Bleed Test

Bleed tests were performed on the test section of a Rame-Hart NRL C. A. Goniometer (model no. 100-00 115). This device allowed a magnified and definable side view of a fluid drop placed on a substrate. The test liquid for the continuous phase component was measured at 26% (+/−1%) and 120° F. (49° C.). The bleed test for the combined continuous and particulate (total composition) was measured at 19% (+/−1%) and 120° F. (49° C.).

The bleed test involved using the unembossed portion of one web of Moresoft™ luxury dinner napkin item #30100, manufactured by Morcon INC, Cambridge, N.Y., 12816, basis weight: 10.6 lbs/3300 $ft^2$, placed over a strip of blotter paper. This substrate conglomerate was placed on the test section of the goniometer under slight tension such that the napkin stock was in intimate contact with the blotter paper without any wrinkles, air pockets or other discontinuities. The height of the test section was adjusted such that the top of the napkin stock coincided with the bottom of the graduated reticle on the eyepiece. A 50 $\mu l$ drop of test liquid from an Eppendorf 100 $\mu l$ micropipette was placed on the napkin stock such that it was visible in the eyepiece and the time required for the drop to reduce to one-quarter its original height measured. The graduated reticle on the eyepiece served as the measurement device for the change in height. The bleed test number is an average of at least five measurements for each sample being investigated. The napkin stock and blotter was moved between tests to ensure no interaction between the measured drop and previous samples.

The following examples will further illustrate the embodiments of this invention. In these examples all parts are given by weight and all temperatures in degrees Celsius unless otherwise noted. All theological and bleed properties were determined using the procedures described above.

EXAMPLE I

Two ply specialty tissue was made using an adhesive composition comprising a continuous aqueous phase of 17% solids, jet cooked, cationic (quat. 0.02% N) waxy corn starch (40 WF) adhesive, applied at 120° F. to 11 pounds per 3300 $ft^2$ tissue stock at an application rate of 33 g/3300 $ft^2$. Using the rheological and test procedures described above, the dispersed starch adhesive was found to have a zero-shear viscosity of 1.00 Pa·s, a shear-thinning index of 0.94 and a bleed time of greater than 240 seconds. The web path through this converting operation led from two parent roll unwinding stands to a nip between two steel rolls and then to a slitting and rewinding station. The adhesive was sprayed onto the inner side of one ply before the steel rolls. Web speed was about 2100 to 2800 feet per minute.

A successful adhesive in this application will provide sufficient strength to keep the laminated web in register during multiple converting operations such as decorative embossing, cutting, folding, printing or packaging. Bond strength required is defined by the number and severity of the subsequent converting operations. The adhesive must be applied at the desired strength and without causing bleed into the web and strike through onto the outside surface of the article which is in contact with the adjacent article in the roll or stack. This can cause undesirable bonding between adjacent articles such as pick outs on the surface or crossbonding which will cause surface tears or web breaks in subsequent converting steps.

In the above application of forming two ply specialty tissue using the noted continuous phase dispersed starch adhesive, the article had moderate bond strength with no strike through. The results are summarized and compared in Table 1 below.

EXAMPLE II

Two ply bath tissue with a basis weight of 10 pounds per 3300 ft$^2$ per web was laminated using a continuous phase dispersed starch adhesive which was a 28% solids, jet cooked, cationic (quat. 0.02% N) waxy corn starch (40 WF). This dispersed starch adhesive was the same as that used in Example I and had the same Theological and bleed properties (i.e., zero-shear viscosity of 1.00 Pa·s. shear-thinning index of 0.94 and a bleed time of greater than 240 seconds). The adhesive was applied at 160° F. and the web path through this converting operation led from two parent roll unwinding stands to a nip between two steel rolls and then to a slitting and rewinding station. The adhesive was sprayed onto the inner side of one ply on the steel rolls. Web speed was about 1800 feet per minute. Conventionally the webs are kept in register during slitting by embossing a pair of about ½ inch wide mechanically bonded strips on either side of the area to be slit. This embossing process requires frequent adjustment, is labor intensive, weakens the product and leaves areas of less desirable aesthetics and softness.

A successful laminating adhesive, in this application, will provide sufficient strength to retain register through the slitting step without any embossing. This adhesive must not bleed into this light weight and absorbent web and thus strike through onto the opposite side which is in contact with the adjacent article in the roll or stack. This can cause undesirable bonding between adjacent articles such as pick outs on the surface or crossbonding which prevents separation of adjacent articles.

Using the continuous phase dispersed adhesive described above, the two ply bath tissue were prepared at the following application rates and with the results noted.

| Application rate g/3300 ft$^2$ (dry basis) | Strength | Strike Through |
| --- | --- | --- |
| II (a) 6 | good | Excessive, crossbonding of articles |
| II (b) 4 | good | Some crossbond, some pick |
| II (c) 2 | good | None |

It will be noted that while all the applied adhesive amounts provided suitable strength, it was only at the lesser rate of 2 g that the strike through characteristic was satisfactory. Results are summarized and compared in Table 1 below.

EXAMPLE III

A two ply specialty tissue was made using the same procedure as in Example I and a starch adhesive which contained both a continuous dispersed phase and a particulate phase second component. The adhesive comprised a 19.8% solids combination of 1 part of cationic (quat. 0.02% N) waxy corn starch (40 WF), 6 parts of tapioca dextrin and 1 part of crosslinked (epichlorohydrin), cationic (quat. 0.03%N) waxy corn. The continuous phase dispersed starch (cationic waxy corn and tapioca dextrin) had a zero-shear viscosity of 0.17 Pa·s, a shear-thinning index of 0.94 and a bleed time of 50.4 seconds. The total composition (i.e., continuous phase and particulate phase) had a bleed time of 199.0 seconds.

The adhesive was applied to the tissue at a rate of 31.3 g/3300 ft$^2$ with the resulting article displaying an excellent bond strength (suitable for multiple high stress operations) with no strike through. Test results are further summarized and compared in Table 1 below.

EXAMPLE IV

A two ply specialty tissue was made using the same procedure as in Example I and a starch adhesive containing a continuous phase/discrete particulate combination. The adhesive comprised 19 to 20% solids of 1 part cationic quat.) waxy corn starch (40 WF), 6 parts of tapioca dextrin and 1 part of crosslinked (epichlorohydrin), cationic (quat.) waxy corn. The continuous phase dispersed starch (cationic waxy corn and tapioca dextrin) had a zero-shear viscosity of 0.19 Pa·s, a shear-thinning index of 0.96 and a bleed time of 115.8 seconds. The total composition (i.e. continuous phase and particulate phase) had a bleed time of 129.0 seconds.

The adhesive was applied to the tissue at a rate of 25 to 30 g/3300 ft$^2$ with the resulting article displaying excellent bond strength (suitable for multiple high stress operation) with no strike through. Results are further summarized and compared in Table 1 below.

EXAMPLE V

For comparative purposes a two ply specialty tissue was made using the same procedure as Example I and a 19% solids adhesive comprising a continuous phase/particulate phase combination. The adhesive was made up of 1 part of cationic (quat. 0.02% N), waxy corn starch (40 WF), 5 parts of waxy OSA (octenyl succinic acid anhydride) treated enzyme converted maltodextrin and 1 part of crosslinked (epichlorohydrin), cationic (quat. 0.03%) corn starch. The continuous phase (cationic waxy corn and maltodextrin) had a zero-shear viscosity of 0.06 Pa·s, a shear-thinning index of 0.98 and a bleed time of 10.3 seconds. The total or full formulation (i.e., continuous and particulate phases) had a bleed time of 62.3 seconds.

The jet cooked adhesive composition was applied to the tissue at the rate of 18.8 g/3300 ft$^2$ with the resulting product exhibiting low strength and excessive strike through or bleed. The results are summarized and compared in Table 1 below.

EXAMPLE VI

For further comparative purposes, a two ply specialty tissue was made using the same procedure as Example I and a 19% solids adhesive comprising a continuous phase/particulate phase combination. The adhesive was made up of 1 part of cationic (quat.) waxy corn starch (40 WF), 6 parts of tapioca dextrin and 1 part of crosslinked (epichlorohydrin) (quat.) waxy corn starch. The continuous phase (cationic waxy corn and tapioca dextrin) had a zero-shear viscosity of 0.14 Pa·s, a shear-thinning index of 0.96 and a bleed time of 11.8 seconds. The full formulation (i.e. continuous phase and particutate phase) had a bleed time of 62.3 seconds.

The jet cooked adhesive composition was applied to the tissue at the rate of 30 g/3300 ft$^2$ with the resulting product exhibiting moderate strength with poor strike characteristics (much through bond displayed). Results are summarized and compared in Table 1 below.

EXAMPLE VII

This example illustrates the use of contact application procedures where transfer rolls are employed.

Tests were run on a two foot trim width pilot towel embossing machine built by Paper Converting Machinery INC, Green Bay, Wis. A two ply towel was laminated using 14.5 pound per 3300 square feet towel stock. Each web, on this machine, runs from a parent roll unwinding stand to a nip between a rubber clad roll and an ebonite embossing roll. The web is forced by the rubber roll into recesses around projections on the ebonite roll thus developing a smooth finished article top surface with projections on the interior surface comprising about 15% of the surface area. The ebonite rolls are arranged so that they form a nip with each projection tip in register with a matching tip on the opposing roll. One ebonite roll has an adhesive transfer roll application system in contact with the web. This consists of an enclosed doctor blade which applies adhesive to an engraved roll which then meters adhesive onto a rubber roll which transfers adhesive to the tips of the embossed web. As the embossing rolls rotate the two webs are joined tip to tip in the nip and the adhesive bonds the two embossed webs into a two ply towel. For this trial the combined webs were rewound in a large roll without cutting or slitting.

A suitable adhesive must flow through the application system uniformly at all running speeds and must transfer across the nips without misting, stringing or spitting. It must develop a rapid bond to keep the webs in register as they leave the combining nip and pass through downstream converting steps such as slitting, rewinding and packaging. It must have a strong dry bond for final consumer use. Adhesive bleed into the web can occur under the pressure of the combining nip. This is not apparent in the finished product since the adhesive is in the interior of the bulky embossed structure. Bleed which results in strike through of adhesive to the embossing roll projection tips will result in weaker bonds, or adhesion of the web to the embossing roll causing pickouts, delamination and eventually wrapping of the web around the embossing roll. Adhesive strike through strongly affects product quality and machine runnability.

Following the procedure described above, two ply towel was laminated using a 29.6% solids continuous phase aqueous dispersed tapioca dextrin adhesive. This continuous phase material was measured using the test procedures described above but at 25° C. instead of 49° C. and found to have a zero-shear viscosity of 0.11 and a bleed time of 10.4 seconds. The adhesive was applied to the towel at 875 ft/min (VIIa) and 1600 ft/min. (VIIb) machine speeds and the article displayed the following results:

| Machine Speed (ft./min.) | Bond Strength | Strike Pick |
|---|---|---|
| VII (a) 875 | very strong | very slight |
| VII (b) 1600 | very strong | slight |

Results are summarized and compared in Table 2 below.

EXAMPLE VIII

Two ply towels were laminated using the same procedure as described above except that about 6 feet downstream from steel embossing rolls, the laminated webs were perforated and rewound into consumer rolls using a centerless winder. The same tapioca dextrin adhesive as described in Example VII was used in this application with the following results:

| Machine Speed (ft/min.) | Bond Strength | Strike Pick |
|---|---|---|
| VIII (a) 875 | very strong | none |
| VIII (b) 1200 | very strong | slight |

Results are summarized and compared in Table 2 below.

EXAMPLE IX

For comparative purposes, a two ply towel was laminated using the same procedure as Example VII and a 12% solids adhesive comprising 2 parts of propylated enzyme degraded waxy starch and 1 part crosslinked waxy starch. The continuous phase has a zero-shear viscosity of 0.066 Pa·s, and a bleed time of 12 seconds. The adhesive was applied to the towel at a machine speed of 875 ft/min and the resulting article had no bond strength and no apparent strike/pick.

Results are summarized and compared in Table 2 below.

Observing the results given in Table 1 below for non-contact applications, it is noted that when using the adhesive compositions of this invention i.e., Examples I to IV which satisfied rheology and bleed time criteria for both the continuous and discrete particulate phases, satisfactory bond strength and bleed were provided. In comparison, when using adhesives which did not meet the required criteria in one aspect or another (Examples V and VI), either bond strength or bleed or both were not satisfactory. Similar results were displayed when using contact applications as shown in Table 2. In Table 2, when using the adhesives of this invention (Examples VII and VIII), bond strength and bleed properties were satisfactory. However, when using the comparative adhesive (Example IX), which did not satisfy the property requirements, the resulting bond strength and bleed properties were not acceptable.

TABLE 1

NON-CONTACT APPLICATIONS

| EXAMPLE NUMBER | CONTINUOUS PHASE PROPERTIES* | | | CONTINUOUS & DISCRETE PARTICULATE PHASE** Bleed time (sec) | TEST DATA | | |
|---|---|---|---|---|---|---|---|
| | Zero Shear viscosity (Pa·s) | Shear thinning index | Bleed time (sec) | | Solids | Bond strength | Bleed |
| I | 1.00 | 0.94 | >240 | | 17.0% | moderate | none |
| II (a) | 1.00 | 0.94 | >240 | | 28.0% | high | high |
| II (b) | 1.00 | 0.94 | >240 | | 28.0% | high | moderate |
| II (c) | 1.00 | 0.94 | >240 | | 28.0% | high | none |
| III | 0.17 | 0.94 | 50.4 | 199.0 | 19.8% | high | none |
| IV | 0.19 | 0.96 | 115.8 | 129.0 | 19.2% | high | none |
| V (comparative) | 0.06 | 0.98 | 10.3 | 65.0 | 19.0% | low | high |
| VI (comparative) | 0.14 | 0.96 | 11.8 | 62.3 | 19.0% | moderate | high |

*Test conditions are 26% solids at 120° F. (49° C.)
**Test conditions are 19% solids at 120° F. (49° C.)

TABLE 2

CONTACT APPLICATIONS

| EXAMPLE NUMBER | CONTINUOUS PHASE PROPERTIES* | | | TEST DATA | | | |
|---|---|---|---|---|---|---|---|
| | Zero Shear viscosity (Pa·s) | Testing Solids | Bleed time (sec) | Solids | Machine Speed (ft/min) | Bond strength | Strike Pick |
| VII (a) | 0.11 | 26% | 10.4 | 29.6% | 875 | very strong | very slight |
| VII (b) | 0.11 | 26% | 10.4 | 29.6% | 1600 | very strong | slight |
| VIII (a) | 0.11 | 26% | 10.4 | 29.6% | 875 | very strong | none |
| VIII (b) | 0.11 | 26% | 10.4 | 29.6% | 1600 | very strong | slight |
| IX (comparative) | 0.066 | 26% | 12 | 12.0% | 875 | none | none |

*Test conditions are at typical applications solids at room temperature (25° C.)

What is claimed is:

1. A light weight, paper laminating, aqueous, high-solids, polysaccharide adhesive composition comprising from about 15 to 50% by weight of starch or dextrin or blends of starch and dextrin as a continuous aqueous phase, these dispersed starches and dextrins having:
   a) a zero-shear viscosity of 0.07 Pa·s at about 26% (+/−1%) solids, 120° F. (49° C.) and a shear rate of $0.1s^{-1}$,
   b) a shear thinning index of about 0.9 to 1.1, and the adhesive composition having a bleed time of greater than 15 seconds, both at 26% solids (+/−1%) and 49° C.

2. The adhesive composition of claim 1 where the zero-shear viscosity is greater than 0.1 Pa·s.

3. The adhesion composition of claim 1 wherein the bleed time is greater than 50 seconds.

4. The adhesive composition of claim 1 which further comprises a water swellable, insoluble polysaccharide particulate phase.

5. The adhesive composition of claim 4 wherein the starch or dextrin in the continuous phase comprises from about 13.5 to 48.5% by weight, based on the total weight of the composition and the particulate polysaccharide comprises from about 1.5 to 12.5% by weight, based on the total weight of the composition.

6. The adhesive composition of claim 5 whereas the polysaccharide in the particulate phase is selected, from the group consisting of crosslinked starch, thermally treated starch or gum.

7. The adhesive composition of claim 6 whereas the crosslinked starch is crosslinked with an agent selected from the group consisting of epichlorhydrin, phosphorus oxychloride, adipic-acetic anhydrides, sodium trimetaphosphate and sodium hypochlorite.

8. The adhesive composition of claim 7 whereas the zero-shear viscosity of the continuous phase is greater than 0.1 Pa·s and the bleed time is greater than 15 seconds measured at 26% solids (+/−1%) and 49° C. and the bleed time of the total composition is greater than 70 seconds when measured at 19% solids and 49° C.

9. An aqueous, high solid, polysaccharide adhesive composition suitable for use in contact applications and composition from about 15 to 50% by weight, based on the total weight of the composition, of starch or dextrin or blend thereof dispersed in water, the dispersed starch and dextrin having:

a) A zero-shear viscosity of between greater than 0.2 Pa·s and less than about 20 Pa·s at about 26% (+/−1%) solids, 120° F. (49° C.) and a shear rate of $0.1s^{-1}$, and
   b) The adhesive composition having a bleed time of greater than 7 seconds.

10. The adhesive composition of claim 9 wherein the bleed time is greater than 10 seconds.

* * * * *